(12) United States Patent
Momoo et al.

(10) Patent No.: US 9,595,287 B2
(45) Date of Patent: Mar. 14, 2017

(54) RECORDING AND REPRODUCING APPARATUS

(71) Applicant: Panasonic Intellectual Property Management Co., Ltd., Osaka (JP)

(72) Inventors: Kazuo Momoo, Osaka (JP); Yuichi Takahashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/014,873

(22) Filed: Feb. 3, 2016

(65) Prior Publication Data

US 2016/0254019 A1    Sep. 1, 2016

(30) Foreign Application Priority Data

Feb. 27, 2015 (JP) .................................. 2015-038461

(51) Int. Cl.
| | |
|---|---|
| *G11B 7/007* | (2006.01) |
| *G11B 7/0045* | (2006.01) |
| *G11B 7/14* | (2012.01) |
| G11B 7/0037 | (2006.01) |
| G11B 7/09 | (2006.01) |
| G11B 7/127 | (2012.01) |
| G11B 7/131 | (2012.01) |

(52) U.S. Cl.
CPC ........ *G11B 7/00718* (2013.01); *G11B 7/0045* (2013.01); *G11B 7/14* (2013.01); *G11B 7/0037* (2013.01); *G11B 7/094* (2013.01); *G11B 7/127* (2013.01); *G11B 7/131* (2013.01)

(58) Field of Classification Search
None
See application file for complete search history.

(56) References Cited

U.S. PATENT DOCUMENTS

| | | | |
|---|---|---|---|
| 4,969,137 | A | 11/1990 | Sugiyama et al. |
| 6,493,297 | B1 | 12/2002 | Isono et al. |
| 2002/0141305 | A1 | 10/2002 | Yamanaka |

FOREIGN PATENT DOCUMENTS

| | | |
|---|---|---|
| JP | 03-225637 A | 10/1991 |
| JP | 11-242816 A | 9/1999 |
| JP | 2002-298343 A | 10/2002 |

*Primary Examiner* — Brian Butcher
(74) *Attorney, Agent, or Firm* — Renner, Otto, Boisselle & Sklar, LLP (57) ABSTRACT

A recording and reproducing apparatus according to the present disclosure includes a first optical pickup configured to record information on either a land track and a groove track, with respect to a recording medium that is able to be recorded in the land track and the groove track, a second optical pickup configured to record information on a track different from a track recorded by the first optical pickup, and a controller configured to cause the first optical pickup to record information if tracks of both sides of a track that the first optical pickup follows are recorded, and to cause the second optical pickup to record information if tracks of both sides of a track that the second optical pickup follows are recorded.

3 Claims, 10 Drawing Sheets

RECORDING AND REPRODUCING APPARATUS

BACKGROUND OF THE INVENTION

1. Field of the Invention

The present disclosure relates to a recording and reproducing apparatus for recording and reproducing information on a recording medium.

2. Description of the Related Art

PTL 1 discloses a recording and reproducing apparatus including two optical pickups. In this recording and reproducing apparatus, the two optical pickups record signals in a land and a groove of an optical disc, respectively. As a result, recording signals at a high transfer rate can be realized.

CITATION LIST

Patent Literature

PTL 1: Unexamined Japanese Patent Publication No. H11-242816

SUMMARY OF THE INVENTION

The present disclosure provides a recording and reproducing apparatus that achieves a favorable recording and reproducing quality upon recording information in a land and a groove of a recording medium at the same time.

A recording and reproducing apparatus according to the present disclosure includes a first optical pickup configured to record information on either a land track or a groove track, with respect to a recording medium that is able to be recorded in the land track and the groove track, a second optical pickup configured to record information on a track different from a track recorded by the first optical pickup, and a controller configured to cause the first optical pickup to record information if track of both sides of a track that the first optical pickup follows are unrecorded, and to cause the second optical pickup to record information if track of both sides of a track that the second optical pickup follows are recorded.

The recording and reproducing apparatus according to the present disclosure can achieve a favorable recording and reproducing quality upon recording in a land and a groove of a recording medium at the same time.

DETAILED DESCRIPTION OF THE PREFERRED EMBODIMENTS

Hereinafter, exemplary embodiments will be described in detail with reference to the drawings as appropriate. However, unnecessarily detailed description may be omitted. For example, detailed description of already well-known matters and repetitive description of substantially the same configuration may be omitted, in order to avoid the following description becoming unnecessarily redundant and in order to facilitate understanding of those skilled in the art.

Note that the appended drawings and the following description are provided for those skilled in the art to fully understand the present disclosure, and the subject described in the claims is not intended to be limited by the appended drawings and the following description.

First Exemplary Embodiment

Hereinafter, a first exemplary embodiment will be described with reference to FIGS. 1 to 5.

(1-1. Object)

As means for increasing the transfer rate for recording and reproducing on an optical disc which is an example of a recording medium, there is a configuration that a plurality of optical pickups record and reproduce information in a land and a groove of the optical disc at the same time. In the case of this configuration, the recording state of a track adjacent to a track that is being recorded exerts influences on tracking control for the currently recording track, and exerts influences on the signal quality to the recorded information.

Thus, the present exemplary embodiment provides a recording and reproducing apparatus that realizes a favorable recording and reproducing quality upon recording in a land and a groove of a recording medium at the same time.

(1-2. Configuration)

Figure 1:
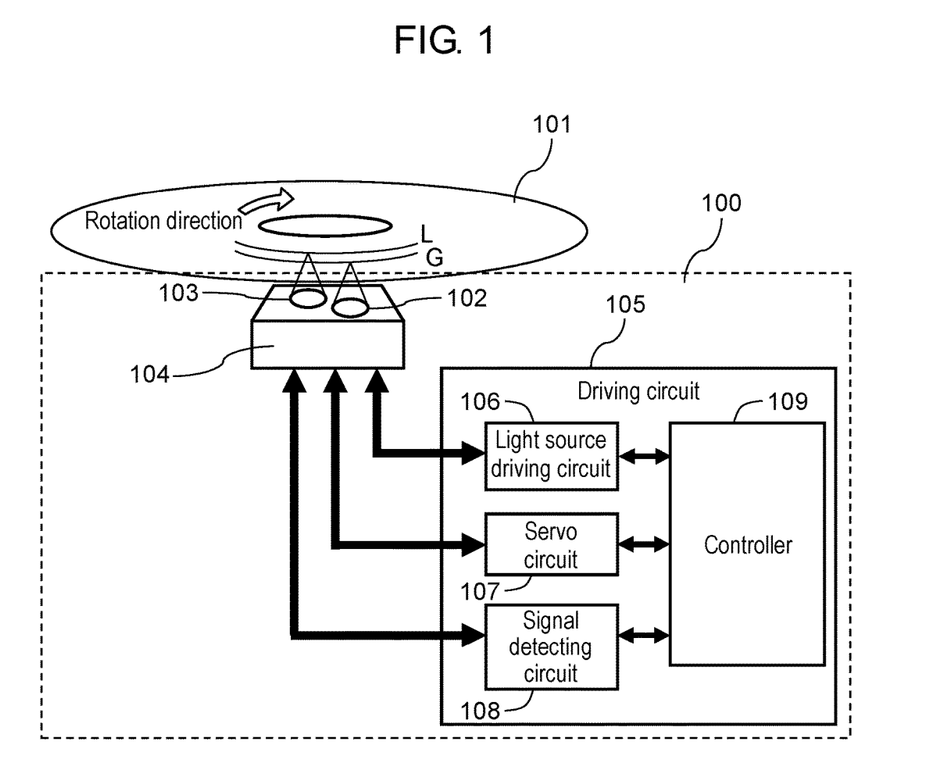
FIG. 1 is a block diagram of a recording and reproducing apparatus according to a first exemplary embodiment.

FIG. 1 is a block diagram of recording and reproducing apparatus 100 according to the first exemplary embodiment. Recording and reproducing apparatus 100 includes optical pickup 104 integrating first optical pickup 102 with second optical pickup 103, and driving circuit 105.

Each of first optical pickup 102 and second optical pickup 103 includes a light source (not shown) for radiating with light on recording medium 101, and a detector (not shown) for detecting light that is reflected by recording medium 101.

For example, the detector includes four divided light receiving regions. Each of the four divided light receiving regions generates a detecting signal in accordance with the received amount of the light reflected by recording medium 101. Each of first optical pickup 102 and second optical pickup 103 generates a focusing error signal, a tracking error signals or the like, based on each of the detecting signals. First optical pickup 102 records information in a groove of recording medium 101. Second optical pickup 103 is disposed on the inner circumferential side of recording medium 101 by one track with respect to first optical pickup 102, and records information in a land adjacent, on the inner circumferential side, to the groove which is recorded by first optical pickup 102.

Driving circuit 105 includes light source driving circuit 106, servo circuit 107, signal detecting circuit 108 and controller 109. Light source driving circuit 106 drives the light source of first optical pickup 102 and the light source of second optical pickup 103. Servo circuit 107 manages focus control and tracking control of first optical pickup 102 and second optical pickup 103. Signal detecting circuit 108 detects an information signal of first optical pickup 102 and an information signal of second optical pickup 103. Controller 109 controls all of light source driving circuit 106, servo circuit 107, and signal detecting circuit 108. The focusing error signals and the tracking error signals output from optical pickup 104 are input to driving circuit 105.

The focusing error signal is a signal indicating a shift in the focus of the optical pickup with respect to the recording surface of recording medium 101. Each of first optical pickup 102 and second optical pickup 103 generates the focusing error signal by, for example, an astigmatic method, based on the detecting signals generated from the four divided light receiving regions.

Each of first optical pickup 102 and second optical pickup 103 operates focusing on recording medium 101, based on the respective focusing error signals. Each of the focusing error signals of first optical pickup 102 and second optical pickup 103 is input to servo circuit 107. And each of objective lens actuators (not shown) of first optical pickup 102 and second optical pickup 103 is driven by each of focus driving signals generated by servo circuit 107 based on each of the focusing error signals. As a result, focusing on recording medium 101 is operated.

The tracking error signal is a signal indicating the positional shift of the objective lens of the optical pickup with respect to a track of recording medium 101. Each of first optical pickup 102 and second optical pickup 103 generates the tracking error signal by, for example, a push-pull method, based on the detecting signals generated form the four divided light receiving regions.

Servo circuit 107 generates tracking drive signals based on each of the tracking error signals of first optical pickup 102 and second optical pickup 103, and drives each of the objective lens actuators of first optical pickup 102 and second optical pickup 103. As a result, tracking on a track is operated.

Signal detecting circuit 108 generates an information signal corresponding to user data, address information corresponding to a position of a track or a position of a sector, and the like, based on detecting signals from each of first optical pickup 102 and second optical pickup 103.

Controller 109 causes servo circuit 107 to operate appropriately focusing or tracking and causes each of first optical pickup 102 and second optical pickup 103 to seek a predetermined track based on the address information output from signal detecting circuit 108. And controller 109 realizes to cause light source driving circuit 106 to record and reproduce information in the predetermined track.

Figure 2:
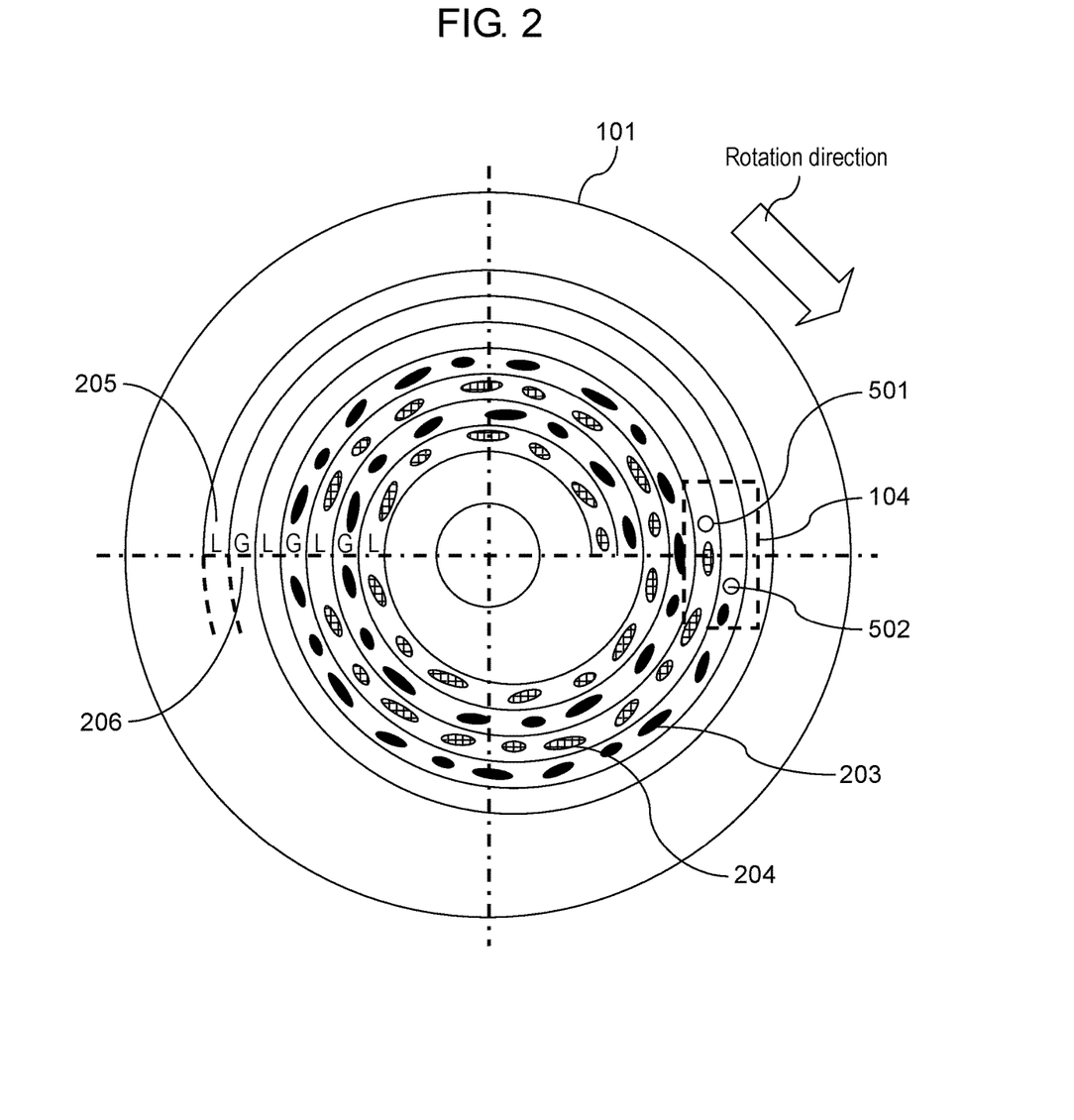
FIG. 2 is a diagram describing a problem of the first exemplary embodiment occurring at a time of recording information on a recording medium.

FIG. 2 is a diagram describing a problem of the first exemplary embodiment occurring at a time of recording information on recording medium 101. Recording medium 101 has tracks that are formed by land 205 and groove 206. First light spot 501 by first optical pickup 102 and second light spot 502 by second optical pickup 103 are focused on recording medium 101. First light spot 501 is on the inner circumferential side, and second light spot 502 is on the outer circumferential side. First light spot 501 that precedes in the rotation direction of recording medium 101 is focused on land 205, and following second light spot 502 is focused on groove 206. FIG. 2 shows a state where information is recorded by two rotations from the inner circumferential side of recording medium 101. In FIG. 2, lattice marks 204 spirally shown on land 205 indicate the recorded marks recorded by first optical pickup 102, and similarly, black marks 203 shown on groove 206 indicate the recorded marks recorded by second optical pickup 103. In the case where recording on recording medium 101 is continued from the state in FIG. 2, information is always already recorded in groove 206 which is an adjacent track on the inner circumferential side of first light spot 501 by preceding first optical pickup 102, and information is always not recorded in groove 206 which is an adjacent track on the outer circumferential side of first light spot 501 by preceding first optical pickup 102. Similarly, information is always already recorded in land 205 which is an adjacent track on the inner circumferential side of second light spot 502 by following second optical pickup 103, and information is always not recorded in land 205 which is an adjacent track on the outer circumferential side of second light spot 502 by following second optical pickup 103. That is, each of first optical pickup 102 and second optical pickup 103 records information in a state where information is already recorded in a track that is adjacent on one side of the track to be recorded and where information is not recorded in a track that is adjacent on the other side of the track to be recorded.

Here, a problem occurring in a case where information is recorded in both land and groove will be described. When information is recorded in both land and groove, the recording density can be improved by reducing the track pitch. In the case of reducing the track pitch in groove recording where information is recorded in only the groove, it is necessary to reduce the groove pitch, but it is often difficult to reduce the groove pitch for a reason of manufacturing of the recording medium. For example, in the case of a Blu-ray (registered trademark) disc, the groove pitch is 0.32 nm, and reduction in the pitch also causes many problems in mastering and molding of the disc, and is likely to lead to a significant cost increase. In contrast, in the case of recording in both the land and the groove, the track pitch can be reduced without a burden on the manufacturing of the recording medium. For example, even in a case where the groove pitch is 0.45 μm which is greater than the groove pitch 0.32 μm of the Blu-ray (registered trademark) disc, the track pitch which is the gap between the land and the groove is 0.225 μm, and is 0.7 times the track pitch of the Blu-ray (registered trademark) disc, in the case of recording in both the land and the groove.

Figure 3:
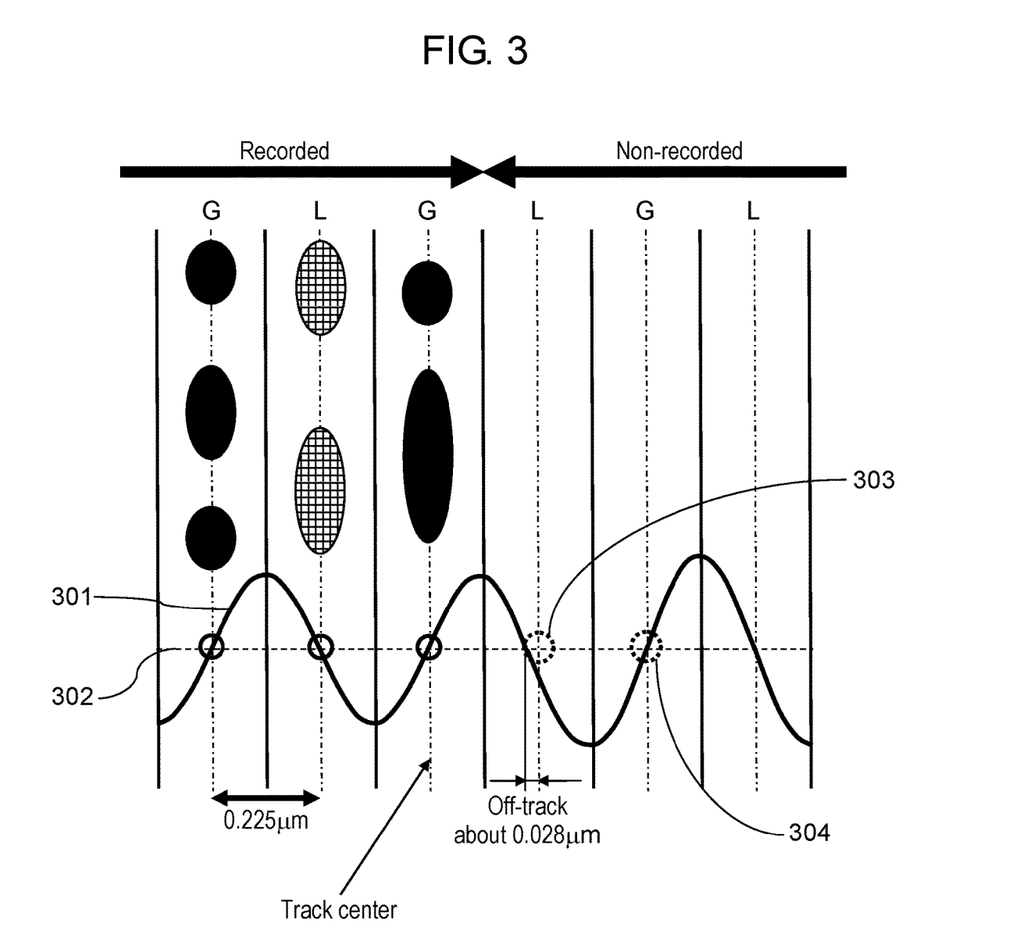
FIG. 3 is another diagram describing a problem of the first exemplary embodiment occurring at a time of recording information on a recording medium.

However, when the track pitch is reduced, the distance to an adjacent track is reduced. Accordingly, various influences may be exerted by the adjacent track. One of the influences is a tracking offset at the boundary between a recorded track and a non-recorded track. FIG. 3 is another diagram describing a problem of the first exemplary embodiment occurring at a time of recording information on recording medium 101. In FIG. 3, information is already recorded in the left three tracks of a groove, a land and a groove, and information is not recorded in the right three tracks of a land, a groove and a land. A sinusoidal waveform in FIG. 3 indicates tracking error signal 301 obtained from simulation, and a dashed line indicates tracking servo level 302. Moreover, a dashed-dotted line at the center of each of the lands and grooves indicates a track center. Here, when tracking is turned on, an intersection point of tracking error signal 301 and tracking servo level 302 is a control point where a spot of the optical pickup is controlled, that is, a target position in tracking. In FIG. 3, the control point of the tracking servo almost coincides with the track center in the recorded tracks. However, as shown by dashed-line circle 303, in a non-recorded land at the boundary betweens the recorded tracks and the non-recorded tracks, the control point of the tracking servo does not coincide with the track center, and off-track of about 0.028 µm occurs.

When off-track occurs in this manner and information is recorded, the following problems are likely to occur.
(1) Since off-track occurs upon recording, thermal interference is likely to have an influence with a recorded mark in adjacent recorded tracks, for example.
(2) When off-track occurs upon recording, the recorded mark is shifted from the track center, and approaches the boundary portion between the land and the groove. Since there are many noise components in the recording medium at the boundary portion between the land and the groove, the quality of the recorded mark is likely to be impaired.
(3) Since a reproducing spot traces the track center upon reproducing, the quality of a reproducing signal is likely to be impaired due to a shift that occurs between the reproducing spot and the recorded mark.

Note that FIG. 3 shows a case where the non-recorded track at the boundary between the recorded track and the non-recorded track is a land, but off-track is likely to occur similarly in a case where the non-recorded track is a groove.

As shown in FIG. 2, in the case that first light spot 501 is on the inner circumferential side and second light spot 502 is on the outer circumferential side and information is recorded in the land and the groove with first light spot 501 that precedes in the rotation direction of recording medium 101, both of a track in which first light spot 501 records and a track in which second light spot 502 are recorded between a recorded track in the inner circumferential side and a non-recorded track in the outer circumferential side. And off-track occurs in the tracking control, and the problems described above are likely to occur.

Figure 4:
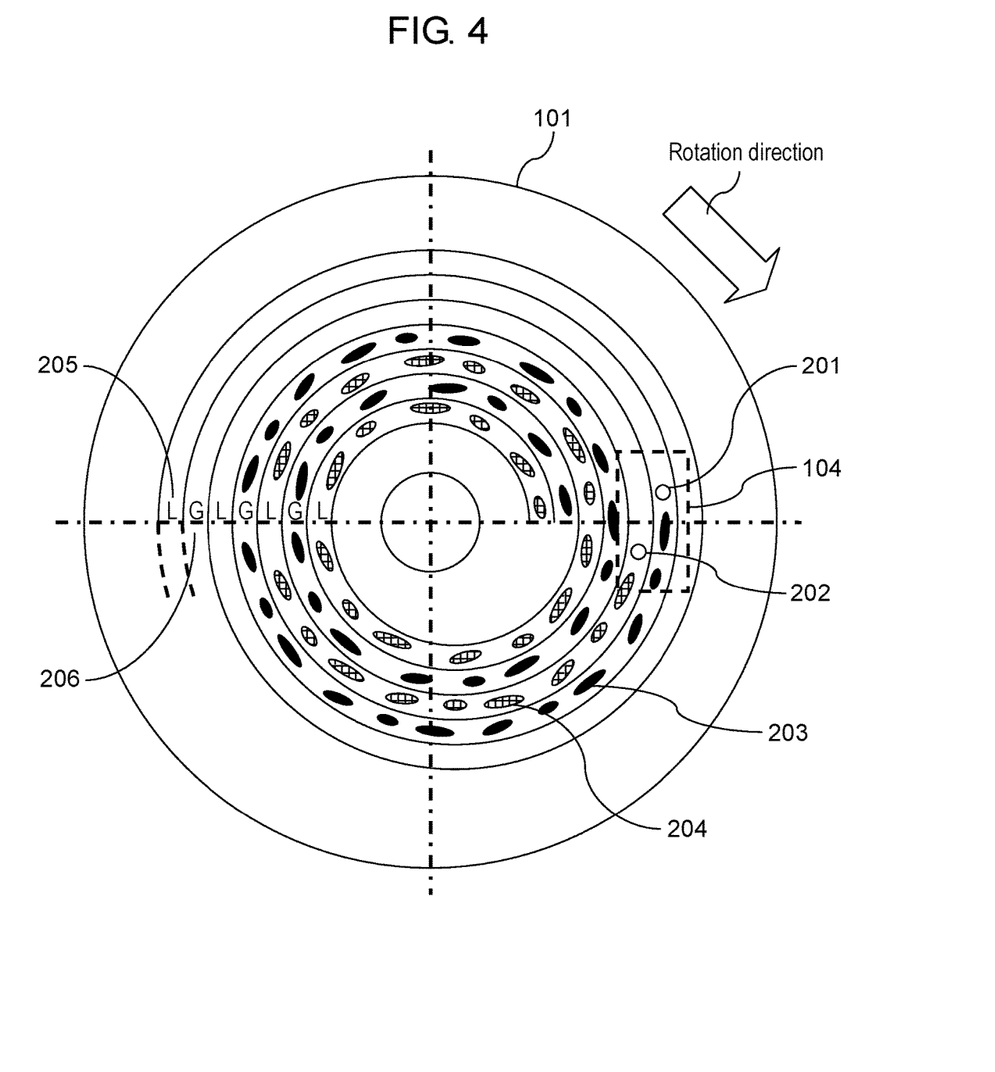
FIG. 4 is a diagram describing recording information on a recording medium according to the first exemplary embodiment.

FIG. 4 is a diagram describing recording information on a recording medium according to the first exemplary embodiment. In the present exemplary embodiment, in order to solve the problems described above, information is recorded in the land and the groove of recording medium 101 as shown in FIG. 4. The same elements as the elements in FIG. 2 are denoted by the same reference numerals, and description of the same elements is omitted. In FIG. 4, first light spot 201 by first optical pickup 102 and second light spot 202 by second optical pickup 103 are focused on recording medium 101. First optical pickup 102 is on the outer circumferential side, and second light spot 202 is on the inner circumferential side. First light spot 201 that precedes in the rotation direction of recording medium 101 is focused on groove 206, and following second light spot 202 is focused on land 205. Tracks on lands adjacent on both sides of preceding first light spot 201 are non-recorded, and tracks on grooves adjacent on both sides of following second light spot 202 are recorded. That is, controller 109 causes first optical pickup 102 to record information if information is not recorded in the tracks adjacent on both sides of the track that first optical pickup 102 follows, and causes second optical pickup 103 to record information if information is already recorded in the tracks adjacent on both sides of the track that second optical pickup 103 follows.

Here, presence or absence of occurrence of off-track at preceding first light spot 201 is checked. In FIG. 3, the track where preceding first light spot 201 is to record is a non-recorded groove, and information is not recorded in lands which are the tracks on both sides of the track. As shown by dashed-line circle 304, the control point of the tracking servo almost coincides with the track center, and off-track does not occur.

Figure 5:
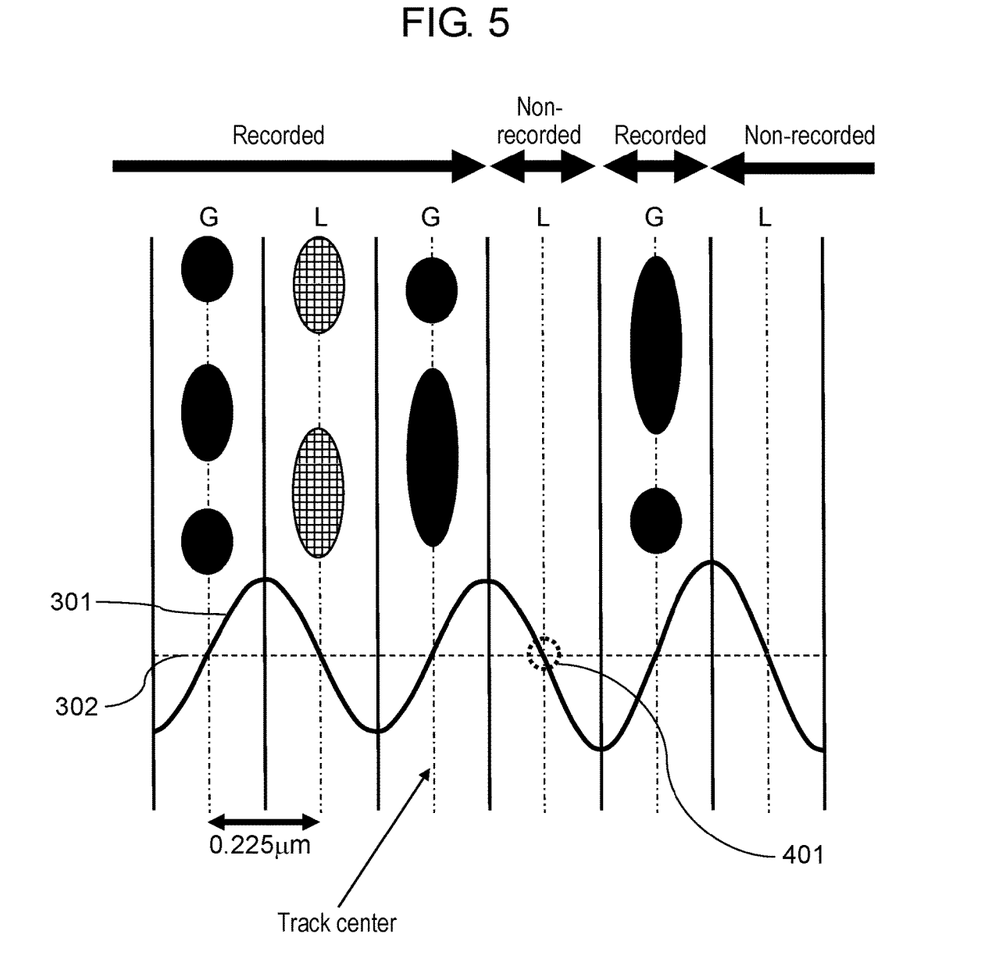
FIG. 5 is another diagram describing recording information on a recording medium according to the first exemplary embodiment.

Next, presence or absence of occurrence of off-track at following second light spot 202 is checked. FIG. 5 is another diagram describing recording information on a recording medium according to the first exemplary embodiment. In FIG. 5, the track where following second light spot 202 is to record is a track of a land for which the tracks on both sides are recorded groove tracks. As shown by dashed-line circle 401, the control point of the tracking servo almost coincides with the track center, and off-track does not occur.

In this manner, off-track does not occur in a case where information is not recorded in the tracks adjacent on both sides of a track where information is recorded, or in a case where information is already recorded in the adjacent tracks on both sides of a track where information is recorded. Accordingly, in the present exemplary embodiment, off-track does not occur at any of first light spot 201 and second light spot 202, and the recording operation can be stably performed. Therefore, favorable recording and reproducing that does not have deterioration due to off-track in the quality of various recording and reproducing signals can be realized.

(1-3. Effects, Etc.)
As described above, recording and reproducing apparatus 100 according to the present exemplary embodiment includes first optical pickup 102 configured to record information on either land 205 or groove 206, with respect to a recording medium 101 that is able to be recorded in land 205 and groove 206, second optical pickup 103 configured to record information on a track different from a track recorded by first optical pickup 102, and controller 109 configured to cause first optical pickup 102 to record information, if tracks of both sides of the track that first optical pickup 102 follows are unrecorded, and to cause second optical pickup 103 to record information if tracks of both sides of the track that second optical pickup 103 follows are recorded.

As a result, off-track due to the boundary between a recorded track and a non-recorded track does not occur at any of first light spot 201 formed by first optical pickup 102 and second light spot 202 formed by second optical pickup 103, and a favorable recording and reproducing operation where reduction in the quality of recording and reproducing is not caused by the off-track can be realized.

Figure 6:
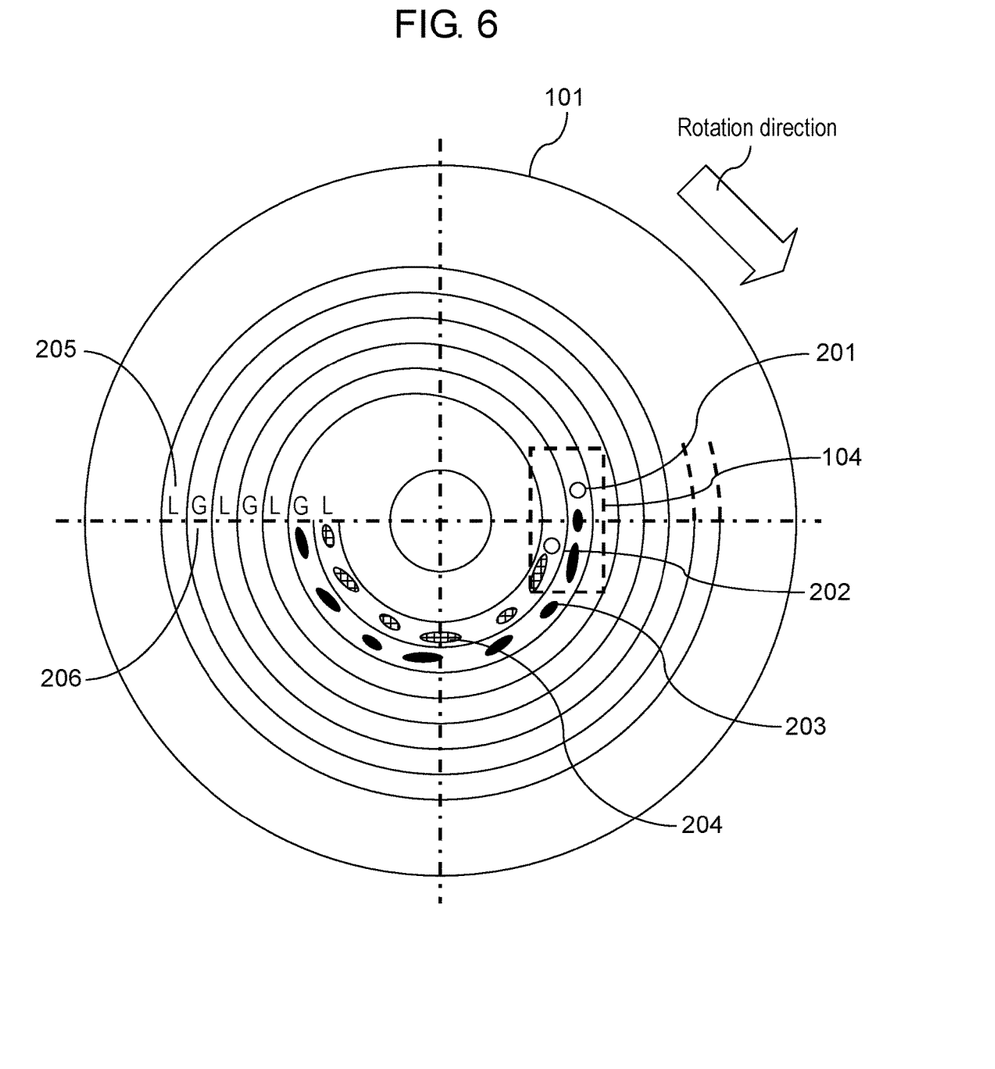
FIG. 6 is a diagram describing a problem of a second exemplary embodiment occurring at a time of recording information on a recording medium.

Second Exemplary Embodiment (2-1. Configuration)
Hereinafter, a second exemplary embodiment will be described with reference to FIGS. 6 to 8B.
FIG. 6 is a diagram describing a problem of the second exemplary embodiment occurring at a time of recording information on a recording medium. FIG. 6 shows a state where recording is performed by recording and reproducing apparatus 100 described in the first exemplary embodiment by about half the rotation from the innermost circumference of recording medium 101. In FIG. 6, information is not recorded in the adjacent tracks on both sides of first light spot 201, but with respect to second light spot 202, information is not recorded on the inner circumferential side and information is already recorded on the outer circumferential side. This is because a groove track is not on the inner side of the innermost circumferential land. Accordingly, information is not recorded in the track on the inner circumferential side of second light spot 202 in the first one rotation, and off-track occurs upon recording.

Thus, in the present exemplary embodiment, as with the first exemplary embodiment, first optical pickup 102 is disposed before second optical pickup 103 in the rotation direction of recording medium 101. Further, controller 109 controls second optical pickup 103 to start recording information with a delay of one or more rotations with respect to first optical pickup 102, and to record information in a track between tracks where information has been recorded by first optical pickup 102.

Figure 7A:
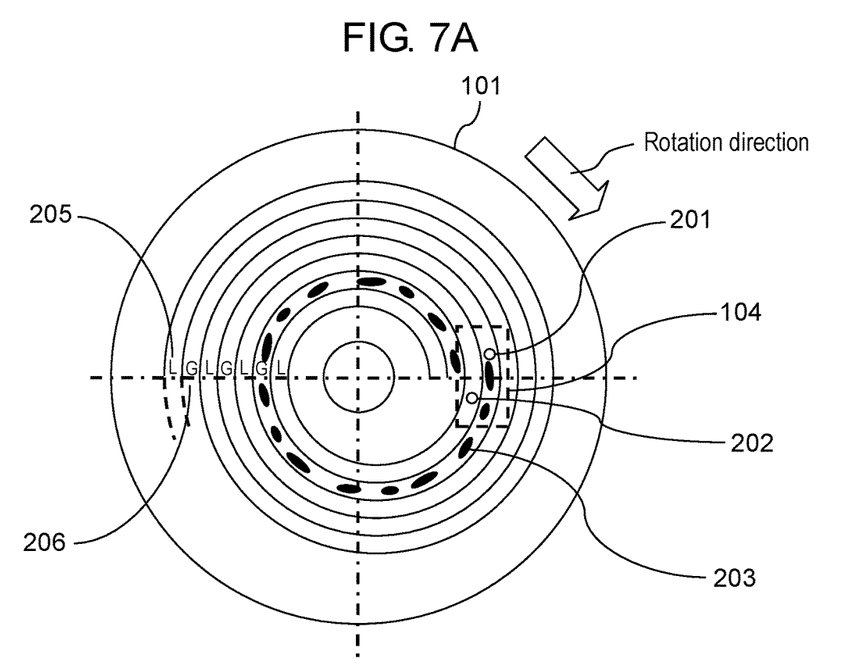
FIG. 7A is a diagram describing recording information on a recording medium according to the second exemplary embodiment.
Figure 7B:
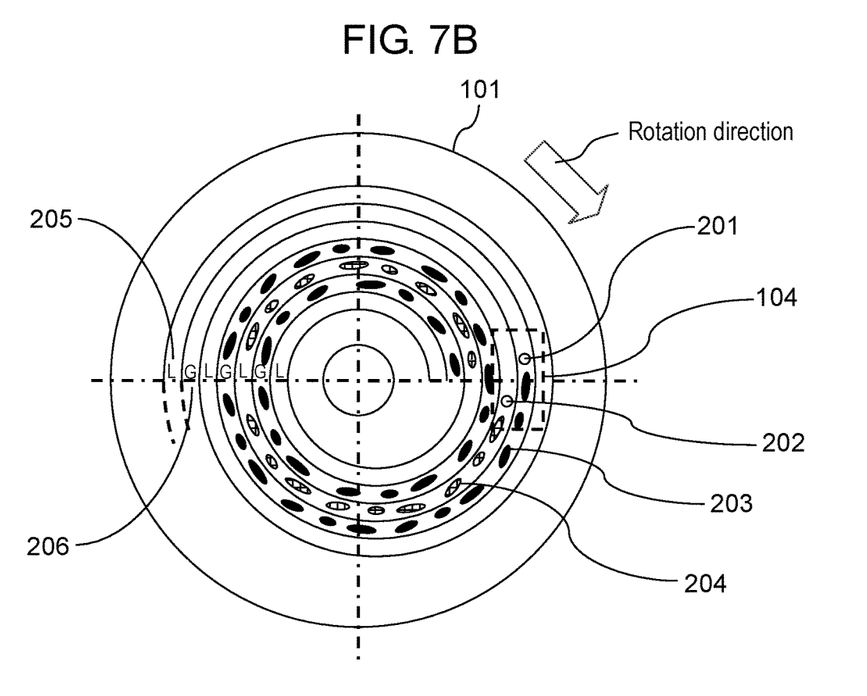
FIG. 7B is another diagram describing recording information on a recording medium according to the second exemplary embodiment.

FIGS. 7A and 7B are diagrams describing recording information on a recording medium according to the second exemplary embodiment. FIG. 7A shows a state where recording is started from the inner circumferential side of recording medium 101, and where information is recorded by about one rotation. Information is recorded by preceding first light spot 201 in the groove, but information is not recorded by following second light spot 202 in the land. Second light spot 202 does not record information in the first round, and starts recording from the second round. FIG. 7B shows a state where recording is started from the inner circumferential side of recording medium 101, and where information is recorded by about two rotations. First light spot 201 records information for about two rounds, and second light spot 202 records information for about one round. In this manner, the start of recording by following second light spot 202 is delayed than the start recording by preceding first light spot 201 by about one rotation. As a result, when information is recorded in all the tracks of recording medium 101, information is not recorded in the tracks adjacent on both sides at a time of recording by first optical pickup 102, and information is already recorded in the tracks adjacent on both sides at a time of recording by second optical pickup 103. Accordingly, a favorable recording and reproducing operation where off-track does not occur in any of the tracks can be realized.

Note that FIGS. 7A and 7B show as an example a case where second light spot 202 starts recording with a delay of about one rotation, but recording information may starts with a delay of two or more rotations.

Figure 8A:
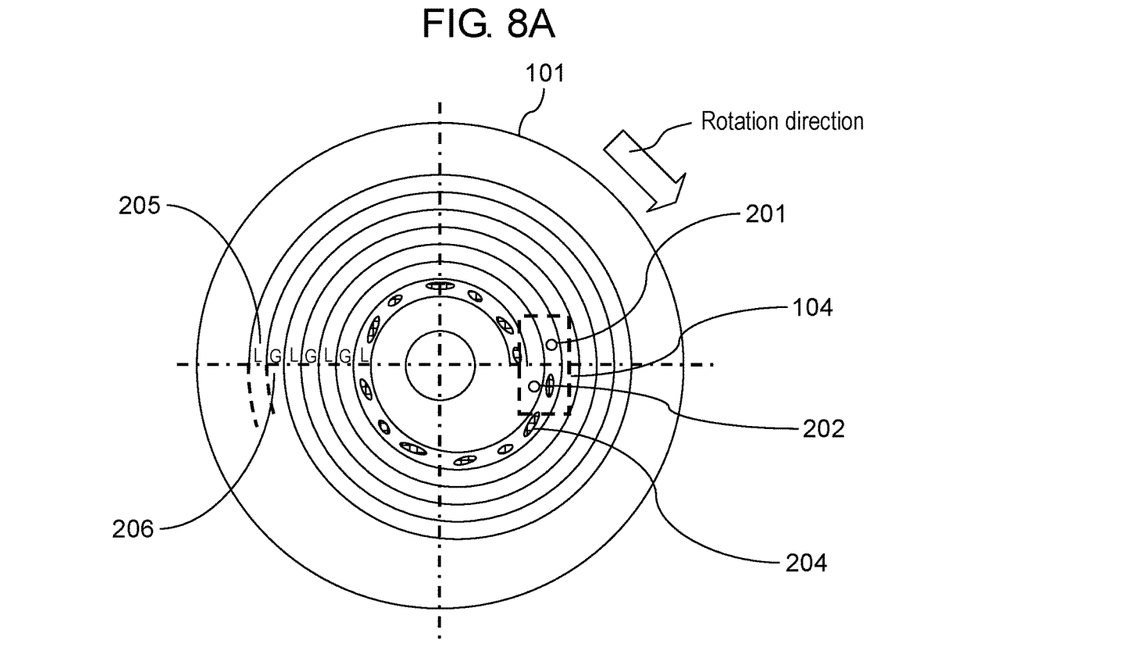
FIG. 8A is still another diagram describing recording information on a recording medium according to the second exemplary embodiment.
Figure 8B:
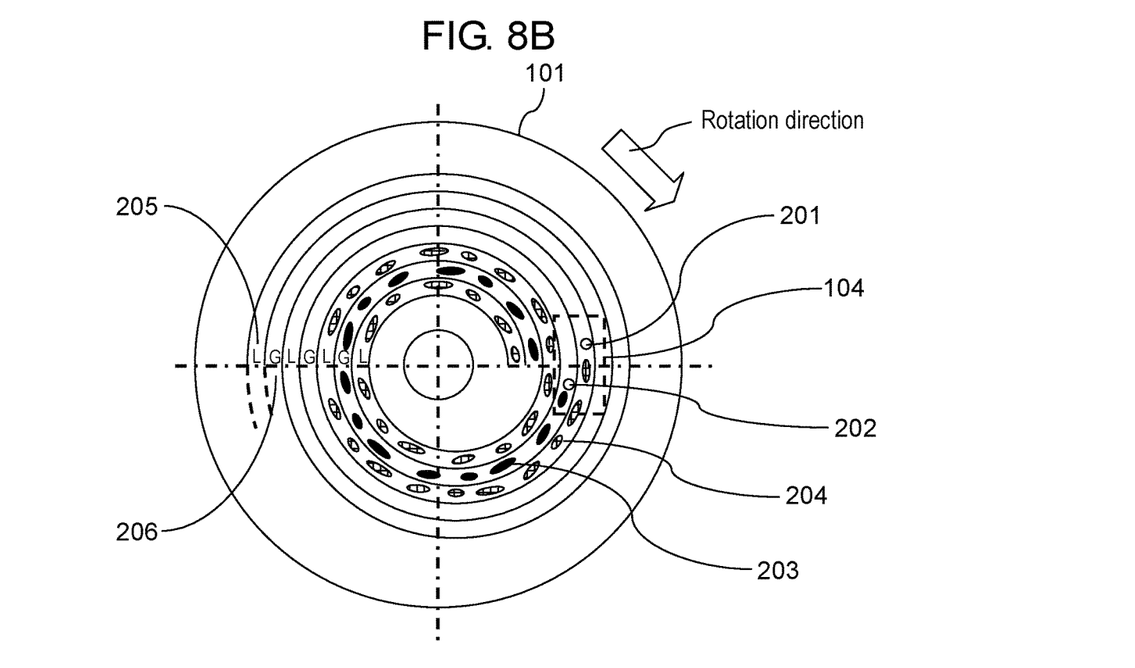
FIG. 8B is still another diagram describing recording information on a recording medium according to the second exemplary embodiment.

Moreover, in the configuration of FIGS. 7A and 7B, one round of the land on the innermost circumference of recording medium 101 remains unused, but information may be recorded in the land on the innermost circumference. FIGS. 8A and 8B are diagrams describing recording information on a recording medium according to the second exemplary embodiment. In FIGS. 8A and 8B, preceding first light spot 201 is disposed in land 205, and following second light spot 202 is disposed in groove 206 that is adjacent on the inner circumferential side of land 205 of preceding first light spot 201. FIG. 8A shows a state where recording is started from the inner circumferential side of recording medium 101, and where information is recorded by about one rotation, and FIG. 8B shows a state where recording is started from the inner circumferential side of recording medium 101, and where information is recorded by about two rotations. Recording on recording medium 101 is started from land 205 on the innermost circumference. Then, the start of recording by following second light spot 202 is delayed than the start of recording by preceding first light spot 201 by about one rotation. As a result, when information is recorded in all the tracks of recording medium 101, information is not recorded in the tracks adjacent on both sides at a time of recording by first optical pickup 102, and information is already recorded in the tracks adjacent on both sides at a time of recording by second optical pickup 103. Accordingly, a favorable recording and reproducing operation where off-track does not occur in any of the tracks can be realized.

Note that FIGS. 8A and 8B show as an example a case where second light spot 202 starts recording with a delay of about one rotation, but the recording may be started with a delay of two or more rotations.

(2-2. Effects, Etc.)

As described above, recording and reproducing apparatus 100 according to the present exemplary embodiment includes first optical pickup 102 configured to record information on either land 205 or groove 206, with respect to a recording medium 101 that is able to be recorded in land 205 and groove 206, second optical pickup 103 configured to record information on a track different from a track recorded by first optical pickup 102, and controller 109 configure to cause first optical pickup 102 to record information, if tracks of both sides of the track that first optical pickup 102 follows are unrecorded, and to cause second optical pickup 103 to record information if tracks of both sides of the track that second optical pickup 103 follows are recorded.

Then, first optical pickup 102 is disposed before second optical pickup 103 in the rotation direction of recording medium 101. Further, controller 109 causes second optical pickup 103 to start recording information with a delay of one or more rotations with respect to first optical pickup 102, and to record information in a track between tracks recorded by first optical pickup 102. As a result, off-track due to the boundary between a recorded track and a non-recorded track does not occur at any of first light spot 201 formed by first optical pickup 102 and second light spot 202 formed by second optical pickup 103, and a favorable recording and reproducing operation where reduction in the quality of recording and reproducing is not caused by the off-track can be realized.

Third Exemplary Embodiment (3-1. Configuration)

Hereinafter, a third exemplary embodiment will be described with reference to FIGS. 9A and 9B.

Generally, in a recording medium such as an optical disc, the number of land tracks and the number of groove tracks in the data area are often set to be equal. In the case of the configuration described with reference to FIGS. 7A and 7B in the second exemplary embodiment where second light spot 202 starts recording with a delay of about one rotation, information is not recorded in the land track on the innermost circumference. Moreover, in the case of the configuration described with reference to FIGS. 8A and 8B in the second exemplary embodiment where second light spot 202 starts recording with a delay of about one rotation, the groove track on the outermost circumference is made a track where information is not recorded. When information is erroneously recorded in these tracks where information is not recorded, off-track is likely to occur.

Thus, in the present exemplary embodiment, controller 109 causes first optical pickup 102 to record pseudo data in a period when recording is not started by second optical pickup 103. Moreover, controller 109 causes first optical pickup 102 to record the pseudo data in a track other than a track where user data is to be recorded.

Figure 9A:
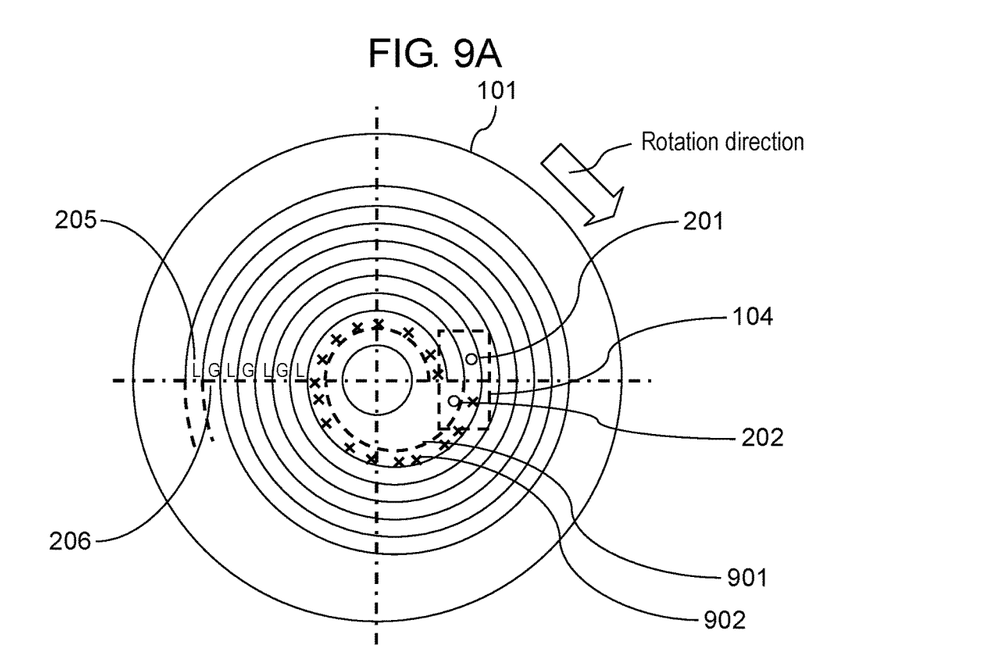
FIG. 9A is a diagram describing recording information on a recording medium according to a third exemplary embodiment.
Figure 9B:
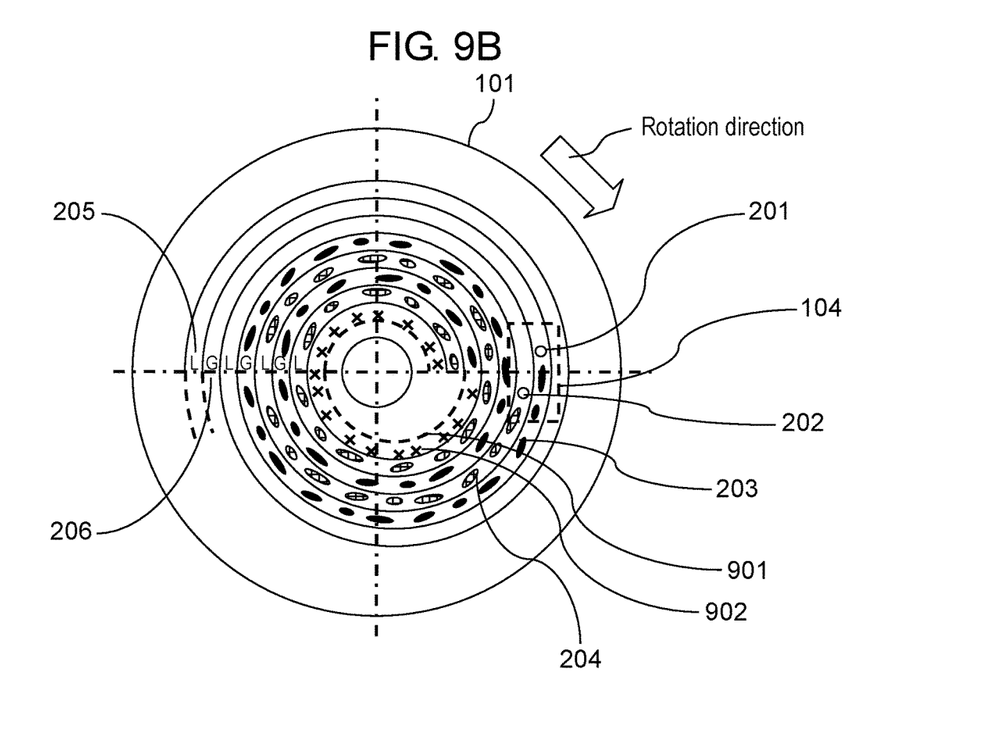
FIG. 9B is another diagram describing recording information on a recording medium according to the third exemplary embodiment.

FIGS. 9A and 9B are diagrams describing recording information on a recording medium according to the third exemplary embodiment. Recording medium 101 has buffer track 901 that is provided on the inner side of the innermost circumferential land track where data is to be recorded. Generally, in a recording medium such as an optical disc, a read-in area or a read-out area for calibration of recording and reproducing conditions is often provided on the inner side or the outer side of the data area where user data is to be recorded. Such a track on the inner circumferential side or the outer circumferential side adjacent to the data area is set as the buffer track. In FIGS. 9A and 9B, x marks indicate pseudo data 902 recorded in buffer track 901. FIG. 9A shows a state where preceding first light spot 201 has recorded pseudo data 902 for about one rotation. Information is not recorded by second light spot 202 while first light spot 201 is recording pseudo data 902. As shown in FIG. 9A, after pseudo data 902 is recorded by about one rotation, data is almost recorded in the groove and the land by first light spot 201 and second light spot 202, respectively at the same time. FIG. 9B shows a state where first light spot 201 and second light spot 202 record data for about two rotations. Information is recorded by about two rotations in both the lands and the grooves including the land track on the innermost circumference. Moreover, as shown in FIG. 9A, pseudo data 902 is recorded in buffer track 901. Thus, at a time of subsequent data recording, information is not recorded in the tracks adjacent on both sides of preceding first light spot 201, and information is already recorded in the tracks adjacent on both sides of following second light spot 202. Accordingly, a favorable recording and reproducing operation where off-track due to the boundary between a recorded track and a non-recorded track does not occur can be performed.

Note that pseudo data 902 to be recorded in buffer track 901 is not limited to specific data, and various types of data may be used, such as an arbitrary random pattern or monotone pattern, or a part of the user data may be borrowed.

Moreover, FIGS. 9A and 9B show as an example a case where pseudo data 902 is recorded in buffer track 901 by about one rotation, but it is also possible to record the pseudo data by one or more rotations. Moreover, with respect to the configuration described with reference to FIGS. 8A and 8B where second light spot 202 starts recording with a delay of about one rotation, the pseudo data may be recorded in a non-recorded track on the outermost circumference.

(3-2. Effects, Etc.)

As described above, recording and reproducing apparatus 100 according to the present exemplary embodiment includes first optical pickup 102 configured to record information on either land 205 or groove 206, with respect to a recording medium 101 that is able to be recorded in land 205 and groove 206, second optical pickup 103 configured to record information on a track different from a track recorded by first optical pickup 102, and controller 109 configured to cause first optical pickup 102 to record information if tracks of both sides of the track that first optical pickup 102 follows are unrecorded, and to cause second optical pickup 103 to record information if tracks of both sides of the track that second optical pickup 103 follows are recorded.

Then, first optical pickup 102 is disposed before second optical pickup 103 in the rotation direction of recording medium 101. Further, controller 109 causes second optical pickup 103 to start recording information with a delay of one or more rotations with respect to first optical pickup 102, and to record information in a track between tracks recorded by first optical pickup 102.

And controller 109 causes first optical pickup 102 to record pseudo data 902 in a period when second optical pickup 103 does not start recording information. Moreover, recording medium 101 includes a user data area and other area, and controller 109 causes first optical pickup 102 to record pseudo data 902 in the track of the other area.

As a result, off-track due to the boundary between a recorded track and a non-recorded track does not occur at any of first light spot 201 and second light spot 202, and it becomes possible to realize a favorable recording and reproducing operation where reduction in the quality of recording and reproducing is not caused by the off-track, and to record information in the lands and the grooves by the equal number of tracks at almost the same time, without leaving non-recorded tracks on the innermost circumference and the outermost circumference.

Other Exemplary Embodiments

Heretofore, the first to the third exemplary embodiments have been described as the examples of the technology of the present disclosure. However, the technology in the present disclosure is not limited to the above embodiments, and can also be applied to exemplary embodiments to which modifications, substitutions, additions, or omissions are made. Moreover, it is also possible to combine the components described in the first to the third exemplary embodiments to achieve a new exemplary embodiment.

Thus, hereinafter, other exemplary embodiments will be described as examples.

(1) In the exemplary embodiments described above, the recording medium has the land track provided on the innermost circumference, but the groove track may be provided on the innermost circumference.

Figure 10:
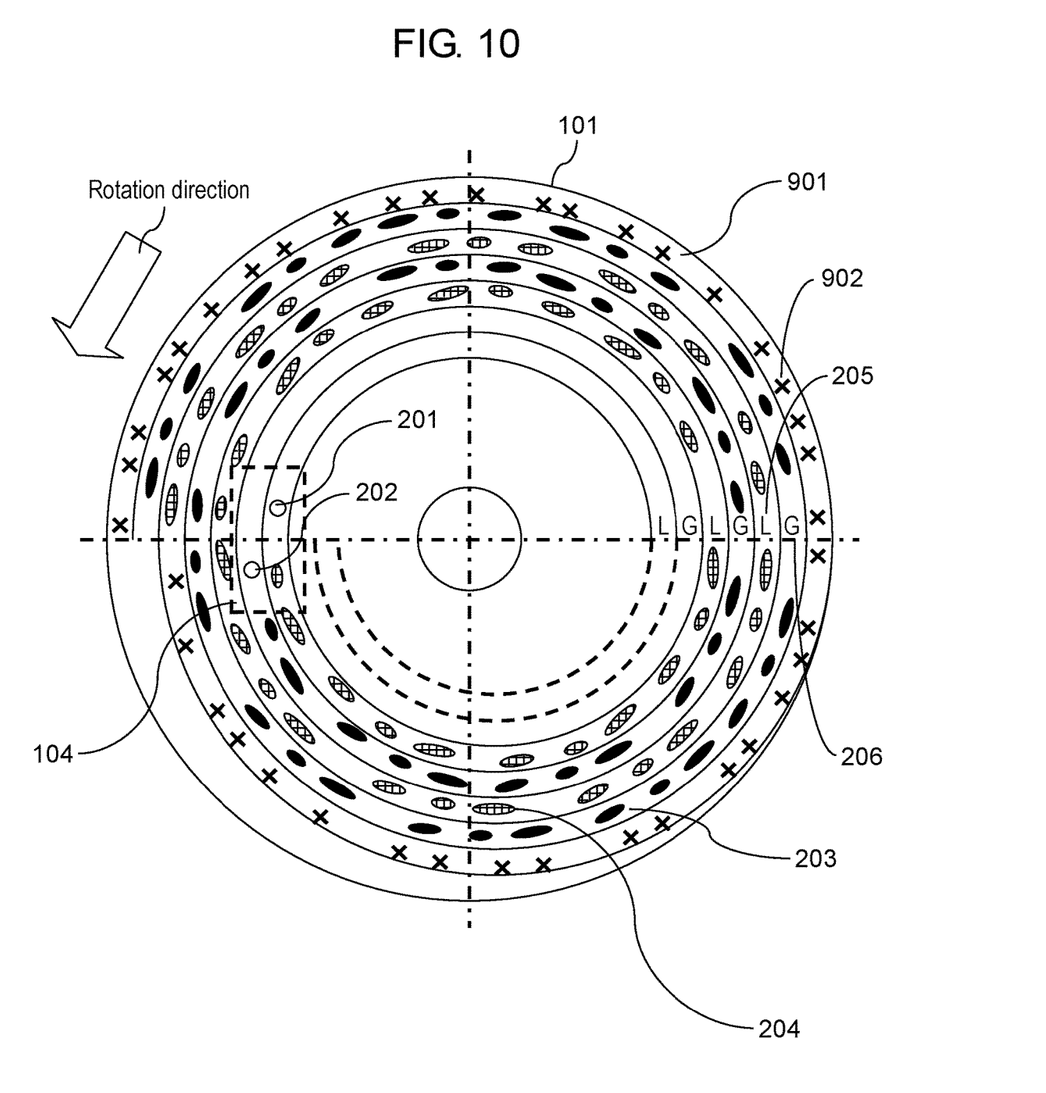
FIG. 10 is a diagram describing recording information on a recording medium according to another exemplary embodiment.

(2) In the exemplary embodiments described above, recording data is started from the inner circumferential side of the recording medium, but the same thing applies also in the case of starting recording data from the outer circumferential side of the recording medium. FIG. 10 is a diagram describing recording information on a recording medium according to another exemplary embodiment. FIG. 10 describes a case of starting recording from the outer circumferential side of recording medium 101. After pseudo data 902 is recorded in buffer track 901 on the outermost circumference for about one rotation by first light spot 201 that is disposed before in the rotation direction of recording medium 101, information is recorded in the land by preceding first light spot 201, and in the groove by following second light spot 202 at almost the same time. FIG. 10 shows a state where information is recorded by about two rotations from the outer circumferential side of recording medium 101. As shown in FIG. 10, information is not recorded in the adjacent tracks of preceding first light spot 201, and information is already recorded in the adjacent tracks of following second light spot 202. Accordingly, off-track due to the boundary between a recorded track and a non-recorded track does not occur, and a favorable recording and reproducing operation where reduction in the quality of recording and reproducing is not caused by the off-track can be realized.

(3) The exemplary embodiments described above describe the case of recording continuously from the innermost circumference or the outermost circumference of recording medium 101, but the same thing applies also in a case of temporarily end the recording in the middle and then starting the recording again. The case of recording in the middle includes a case of recording continuously in the track where information is previously recorded, and a case of recording discontinuously.

As the case of recording continuously, for example, it is assumed that recording is temporarily ended in a state where information is recorded by two rotations as in FIGS. 9A and 9B and FIG. 10. In a case where information is subsequently recorded continuously with respect to the data recorded by two rotations, recording may be restarted directly from a position corresponding to the third rotation.

As the case of recording discontinuously, for example, a case of recording in a track separate from the track where information is previously recorded is assumed. In this case, the tracks around the track where information is to be recorded again are non-recorded tracks. Accordingly, recording may be started by the same method as the method used at a time of start recording from the innermost circumference or the outermost circumference. However, since there is often no buffer track in the tracks in the middle of the recording medium, a data track may be used as the buffer track in the case of recording pseudo data. Moreover, depending on the configuration of the recording medium, there is a case where a buffer track is not on the innermost circumference or the outermost circumference. Accordingly, also in this case, a part of the data track may be used as the buffer track.

(4) In the exemplary embodiments described above, recording and reproducing apparatus 100 includes optical pickup 104 integrating first optical pickup 102 with second optical pickup 103, but first optical pickup 102 and second optical pickup 103 may be independently configured.

(5) The exemplary embodiments described above describe an optical disc as an example of the recording medium, but the recording medium is not limited to the optical disc, and may be a recording medium in a different configuration, such as an optical tape or an optical card.

What is claimed is:

1. A recording apparatus comprising:
a first optical pickup configured to record information on either a land track or a groove track, with respect to a recording medium that is able to be recorded in both the land track and the groove track;
a second optical pickup configured to record information on the other of either the groove track or the land track that are disposed radially in a predetermined track-width distance from a track recorded by the first optical pickup; and
a controller configured to cause the first optical pickup to record information, if tracks of both sides of a track that the first optical pickup follows are unrecorded, and to cause the second optical pickup to record information, if tracks of both sides of a track that the second optical pickup follows are recorded,
wherein the first optical pickup is disposed before the second optical pickup in a rotation direction of the recording medium, and
wherein the controller causes the second optical pickup to start recording information with a delay of one or more rotations with respect to the first optical pickup, and to record information in a track between tracks recorded by the first optical pickup.

2. The recording apparatus according to claim 1, wherein the controller causes the first optical pickup to record pseudo data in a period when the second optical pickup does not start recording information.

3. The recording apparatus according to claim 2,
wherein the recording medium includes a user data area and other area, and
the controller causes the first optical pickup to record the pseudo data in a track of the other area.

* * * * *